US010692103B2

(12) United States Patent
Hasan

(10) Patent No.: US 10,692,103 B2
(45) Date of Patent: Jun. 23, 2020

(54) SYSTEMS AND METHODS FOR HASHTAG EMBEDDING BASED ON USER GENERATED CONTENT FOR CREATING USER SPECIFIC LOYALTY IDENTIFIERS

(71) Applicant: S. Khurrum Hasan, Reston, VA (US)

(72) Inventor: S. Khurrum Hasan, Reston, VA (US)

(73) Assignee: MESPOKE, LLC, Reston, VA (US)

( * ) Notice: Subject to any disclaimer, the term of this patent is extended or adjusted under 35 U.S.C. 154(b) by 0 days.

(21) Appl. No.: 16/290,917

(22) Filed: Mar. 3, 2019

(65) Prior Publication Data
US 2020/0097992 A1 Mar. 26, 2020

Related U.S. Application Data

(60) Provisional application No. 62/733,717, filed on Sep. 20, 2018.

(51) Int. Cl.
G06Q 30/02 (2012.01)
G06Q 50/00 (2012.01)

(52) U.S. Cl.
CPC ..... *G06Q 30/0226* (2013.01); *G06Q 30/0241* (2013.01); *G06Q 30/0229* (2013.01); *G06Q 30/0251* (2013.01); *G06Q 30/0261* (2013.01); *G06Q 30/0269* (2013.01); *G06Q 50/01* (2013.01)

(58) Field of Classification Search
None
See application file for complete search history.

(56) References Cited

U.S. PATENT DOCUMENTS

| 10,475,084 | B2* | 11/2019 | Stoliartchouk | .... G06Q 30/0277 |
| 10,535,080 | B2* | 1/2020 | Jordan | .............. G06Q 30/0261 |
| 2004/0193485 | A1* | 9/2004 | Ilberg | ..................... G06Q 30/02 705/14.27 |
| 2010/0185525 | A1* | 7/2010 | Hazen | .................... G06Q 30/02 705/26.1 |
| 2013/0013390 | A1* | 1/2013 | Paulson-Ellis | ..... G06Q 30/0268 705/14.38 |
| 2013/0198002 | A1* | 8/2013 | Nuzzi | ................ G06Q 30/0256 705/14.58 |
| 2013/0204703 | A1* | 8/2013 | Carlson | .............. G06Q 30/0258 705/14.56 |
| 2014/0150029 | A1* | 5/2014 | Avedissian | ......... G06Q 30/0261 725/60 |

(Continued)

Primary Examiner — Michael J Sittner
(74) Attorney, Agent, or Firm — Polsinelli PC

(57) ABSTRACT

Systems and methods are provided for a digital social media platform that enables embedding of hashtags in user generated content uploaded to the digital social media platform and a secure tracking of the embedded hashtags to create user specific loyalty identifiers. In one aspect, a method includes receiving media content and at least one set of metadata, each set of metadata identifying information associated with a corresponding element within the media content; generating a hashtag for the corresponding element based on a corresponding set of metadata; embedding the hashtag within the media content; publishing the media content with at least one embedded hashtag; tracking engagements of one or more users with the media content having the at least one embedded hashtag to yield a set of statistics; and generating a user specific loyalty identifier for a user associated with the media content, based on the set of statistics.

19 Claims, 9 Drawing Sheets

(56) References Cited

U.S. PATENT DOCUMENTS

| | | | | |
|---|---|---|---|---|
| 2015/0025979 A1* | 1/2015 | Box | ............... | G06Q 30/0261 |
| | | | | 705/14.66 |
| 2015/0248664 A1* | 9/2015 | Makhdumi | ............ | G06Q 30/06 |
| | | | | 235/380 |
| 2016/0019579 A1* | 1/2016 | Sims | ............... | G06Q 30/0242 |
| | | | | 705/14.41 |
| 2017/0330357 A1* | 11/2017 | Siegel | ............... | G06Q 30/02 |
| 2018/0293601 A1* | 10/2018 | Glazier | ............... | G06Q 50/01 |
| 2018/0314882 A1* | 11/2018 | Yu | ............... | G06Q 30/02 |

\* cited by examiner

SYSTEMS AND METHODS FOR HASHTAG EMBEDDING BASED ON USER GENERATED CONTENT FOR CREATING USER SPECIFIC LOYALTY IDENTIFIERS

RELATED APPLICATIONS

This Application claims priority to U.S. Provisional Application 62/733,717 filed on Sep. 20, 2018, the entire content of which is incorporated herein by reference.

TECHNICAL FIELD

The present technology pertains to systems and methods for a digital social media platform that enables embedding of hashtags in user generated content uploaded to the digital social media platform and a secure tracking of the embedded hashtags to create user specific loyalty identifiers.

BACKGROUND

Technological advancements have led to development of various types of digital social media platforms and their use in individuals' professional and personal lives are ever expanding. Each new digital social media platform is developed with at least two main objectives, increased user retainability and increased revenue generation from content providers. Furthermore, content providers compete for access to users of such digital social media platforms and this competition has forced them to devise various methodologies and schemes for reaching their intended audience.

For instance, many and almost all existing digital social media platforms enable their users to upload content/media to these digital social media platforms and allow each user to create hashtags for any number of elements present in the uploaded content. These user created hashtags are then picked up by backend algorithms and used as a basis for charging content providers associated with these hashtags. The picked up algorithms are also used for providing the users of these digital social media platforms with targeted advertisements.

These methods of allowing users to create hashtags and using the hashtags as means for ultimate revenue generation for content providers and operators of these digital social media platforms, leave the users who uploaded the content in the first place and created the hashtags unappreciated and without any recognition for their contribution to the ultimate revenue generation for both content providers and operators of these digital social media platforms. In other words, with hundreds of thousands of different contents being uploaded to the various digital social media platforms available today, there is a vast pool of everyday individual users, whose efforts and time taken for uploading content to these platforms go unrecognized and unrewarded.

Furthermore, currently utilized hashtag creation and methods for tracking them, coupled with various other tools used by digital social media platforms to track and study their users' online footprints, interests and likely purchases, present significant breach of user privacy. Not only these methods inconvenience users by flooding them with targeted advertisements, the user privacy concerns are a hot social and political topic of the day. These factors are significant drivers behind many users terminating their social media accounts.

As another example of user reachability methods utilized by providers of digital social media platforms and content providers, many content providers retain, and in many instances, expend significant capital on celebrities and popular figures (social media influencers) with a large base of followers to advertise their products to their followers on these digital social media platforms. However, reliance on social media influencers are economically inefficient for content providers and at the same time prevents creators and owners of digital social media platforms to maximize their revenue Accordingly, there is a need for an improved digital social media platform that addresses, among many other existing shortcomings, at least the above deficiencies of currently available digital social media platforms.

SUMMARY

Example embodiments are provided for addressing one or more deficiencies of digital social media platforms, as described above. More specifically, digital social media platform of the present application enables automatic creation and embedding of hashtags, at the backend processing center for the digital social media platform, based on user generated content. The digital social media platform further enables tracking the embedded hashtags to create an objective user specific identifier that is indicative of each user's value and level of influence within communities of users (social capital score), which may be redeemable by each user in the form of discounts, promotions, coupons, digital rewards, etc.

More specifically, user generated content may be obtained when each user uploads a particular media content such as photographs, videos, etc., on his or her account on example digital social media platforms of the present disclosure. The user may provide various pieces of information (metadata) for one or more elements within the uploaded media content. Backend processors of example digital social media platforms of the present disclosure convert the metadata into embedded hashtags and make the uploaded content available for viewing within virtual communities of users on the digital social media platform, grouped based on the embedded hashtags and/or the provided metadata. The embedded hashtags and users' interactions therewith may be tracked and each interaction (e.g., view, click, purchases made via the hashtags, etc.) may result in points being assigned to the user who provided the user generated content. These points, among other factors, may be used to create a user specific loyalty identifier for each user, redeemable in the form of coupons, discounts, promotions, etc. at one or more sites (virtual or physical) associated merchants, retailers, service providers, etc.

Example digital social media platforms of the present application can provide the following exemplary advantages. For example, end users who are the creators of uploaded contents are being objectively valued and rewarded for their social media activities. As another example, added security is provided whereby targeted advertisements can be eliminated and tracking of users' online activities may be prevented. As another example, content providers no longer need to rely and expend significant capital on retaining celebrities and popular social figures for advertising their products but can instead rely on a significantly larger source of advertisement formed by millions of individual users, which when combined, have a significantly larger base of audience and users/followers on digital social media platforms, than any one or a few individual celebrities and popular social figures.

In one aspect, a method includes receiving media content and at least one set of metadata, each set of metadata identifying information associated with a corresponding element within the media content; generating a hashtag for the corresponding element based on a corresponding set of metadata; embedding the hashtag within the media content; publishing the media content with at least one embedded hashtag; tracking engagements of one or more users with the media content having the at least one embedded hashtag to yield a set of statistics; and generating a user specific loyalty identifier for a user associated with the media content, based on the set of statistics.

In another aspect, tracking the engagements is triggered when the one or more users selects an element with an embedded hashtag within the media content having the at least one embedded hashtag.

In another aspect, the engagements are a plurality of interactions with the media content having the at least one embedded hashtag, the plurality of interactions including viewing the media content with the at least one embedded hashtag, visiting a website of a brand or a retailer associated with an element in the media content having an embedded hashtag, purchasing at least one product from the website, and purchasing a same or similar product as the element in the media content.

In another aspect, each of the plurality of interactions has a corresponding number of loyalty point.

In another aspect, the method further includes updating a corresponding loyalty points number for the user based on the tracking.

In another aspect, the method further includes generating the user specific loyalty identifier as a weighted combination of a plurality of factors.

In another aspect, the method further includes generating a computer-readable tag associated with the user, based on the user specific loyalty identifier, the computer-readable tag being for retrieving one of discounts, coupons and promotions at one or more merchants.

In one aspect, a digital social media platform includes a plurality of end terminals configured to download and execute computer-readable instructions for providing a corresponding user access to the digital social media platform. The digital social media platform further includes a processing center communicatively coupled to each of the plurality of end terminals and configured to receive, from one or more of the plurality of end terminals, media content to be posted to the digital social media platform, each media content being received with at least one set of metadata, each set of metadata identifying information associated with a corresponding element within the media content; generate a hashtag for the corresponding element based on a corresponding set of metadata; embed the hashtag within the media content; publish the media content with at least one embedded hashtag to the digital social media platform for viewing by users of the digital social media platform via corresponding one of the plurality of end terminals; track engagements of the users with the media content having the at least one embedded hashtag to yield a set of statistics; generate a plurality of user specific indicators based on the set of statistics; and generate a user specific loyalty identifier for a user associated with the media content, based on the plurality of user specific indicators.

In another aspect, the processing center is further configured to embed the user specific loyalty identifier within a computer-readable tag for redeeming the user specific loyalty identifier in a form of a coupon, a promotion or a discount at one or more merchants associated with the digital social media platform.

In another aspect, the processing center is configured to initiate tracking the engagements when one or more of the users selects an element with an embedded hashtag within the media content having the at least one embedded hashtag.

In another aspect, the engagements is one or more of a plurality of interactions with the media content having the at least one embedded hashtag, the plurality of interactions including viewing the media content with the at least one embedded hashtag, visiting a website of a brand or a retailer associated with an element in the media content having an embedded hashtag, purchasing at least one product from the website, and purchasing a same or similar product as the element in the media content.

In another aspect, each of the plurality of interactions has a corresponding number of loyalty points that is assigned to the user when detected during tracking the engagements.

In another aspect, the plurality of user specific indicators includes a total number of loyalty points for the user and the processing center is configured to update the total number based on each detected one of the plurality of interactions.

In another aspect, the processing center is configured to generate the user specific loyalty identifier as a weighted combination of the plurality of user specific indicators.

In one aspect, one or more non-transitory computer-readable media include computer-readable instructions, which when executed by one or more processors, cause the one or more processors to receive content for sharing with one or more remote users having access to a digital platform, the content having at least one set of metadata identifying information associated with a corresponding element within the content; generate at least one hashtag for the content based on the at least one set of metadata; embed the at least one hashtag within the content; provide access to the content having the at least one hashtag on the digital platform; track a level of engagement of each of the one or more remote users with the at least one hashtag to yield tracking statistics; and update, based on the tracking statistics, a user specific loyalty identifier, the user specific loyalty identifier enabling the user to receive value for the content.

In another aspect, the value is one of a coupon, a promotion or a discount at a relevant merchant site.

In another aspect, the computer-readable instructions, when executed by the one or more processors, further cause the one or more processors to embed the user specific loyalty identifier in a computer-readable code for retrieving the value at a relevant merchant site.

In another aspect, the computer-readable instructions, when executed by the one or more processors, further cause the one or more processors to track the engagements when the one or more users selects an element with an embedded hashtag within the content having the at least one embedded hashtag.

In another aspect, the engagements are a plurality of interactions with the content having the at least one embedded hashtag, the plurality of interactions including viewing the content with the at least one embedded hashtag, visiting a website of a brand or a retailer associated with an element in the content having an embedded hashtag, purchasing at least one product from the website, and purchasing a same or similar product as the element in the content, each of the plurality of interactions having an assigned number of points.

In another aspect, the computer-readable instructions, when executed by the one or more processors, further cause the one or more processors to update the user specific loyalty identifier based on detected one of the plurality of interactions and a corresponding assigned number of points.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for an improved digital social media platform that provides an automatic creation and embedding of hashtags into media content uploaded to a profile of user on the improved digital social media platform via an end terminal, where the hashtags are automatically generated based on user provided metadata for one or more elements within the uploaded media content. Other users' interaction and engagements with the embedded hashtag will then be tracked to create unique loyalty identifier for each user indicative of each user's social influence (social capital score). Example embodiments of the improved digital social media platform of the present disclosure further allow such unique loyalty identifiers to be translated into various commercial discounts, promotions, etc. for each respective user. Moreover, example embodiments of the digital social media platform of the present application provide a secure platform that can eliminate tracking of users' personalized information and online activities for targeted advertisements purposes thus improving overall user experience in interacting with novel and improved digital social media platform of the present application.

The disclosure begins with a description of an example social media platform for implementing the present disclosure.

Figure 1:
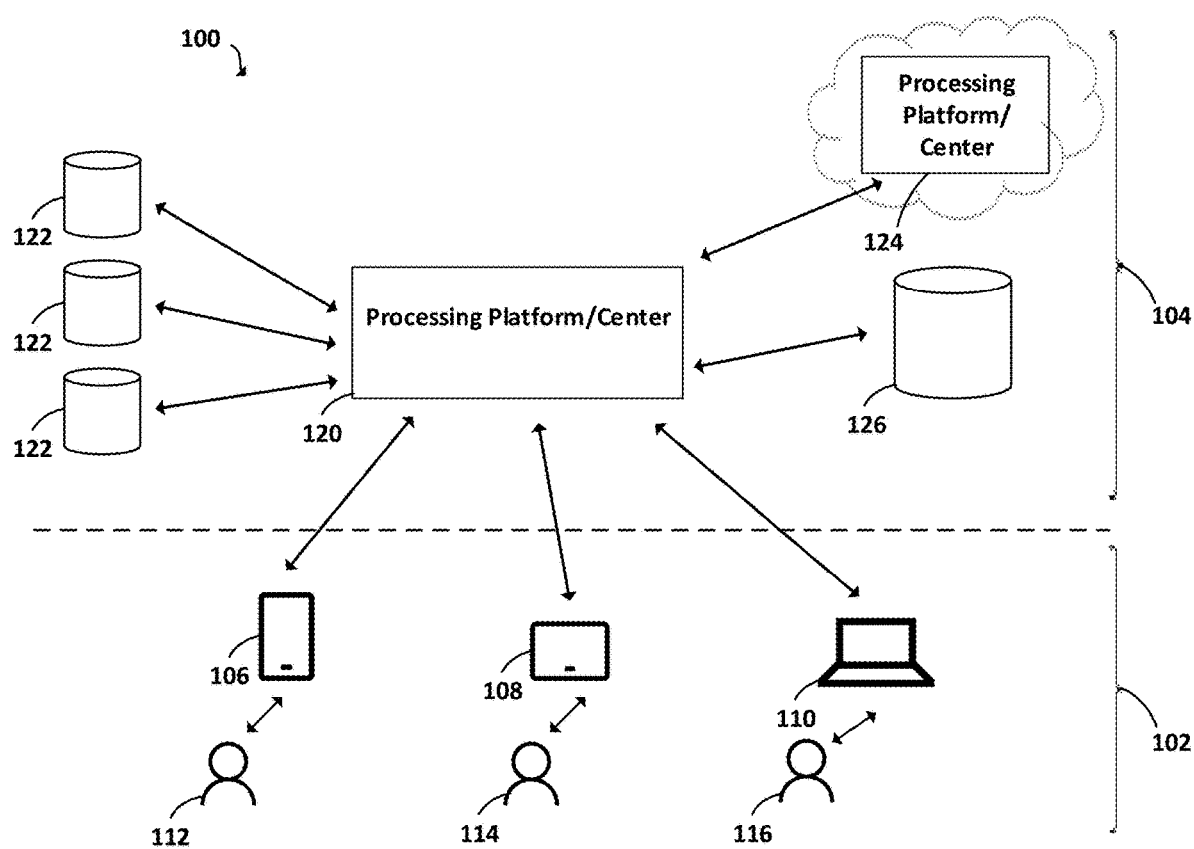
FIG. 1 shows an example system for providing a digital social media platform, according to one aspect of the present disclosure.

FIG. 1 shows an example system for providing a digital social media platform, according to one aspect of the present disclosure. System 100 of FIG. 1 may include a frontend platform 102 and a backend platform 104.

Front end platform 102 may be formed of one or more end terminals (user terminals) 106, 108 and 110 each of which may be associated with a corresponding one of users 112, 114 and 116, respectively.

End terminals 106, 108 and 110 may be any type of known or to be developed computing device capable of downloading computer-readable instructions/applications for a digital social media platform and communicating with backend platform 104 using known or to be developed wired and/or wireless communication schemes. For example, each of end terminals 106, 108 and 110 can be a mobile phone, a tablet, a laptop, a personal digital assistant, a desktop computer, etc. In one example, each of end terminals 106, 108 and 110 can be capable of or be equipped with media capturing components such as a camera for taking photographs and/or videos for uploading and posting to the digital social media application available on the end terminals 106, 108 and 110, as will be described below.

While FIG. 1 illustrates only three end terminals 106, 108 and 110, the present disclosure is not limited thereto and there may be more or less end user terminals such as hundreds, thousands or millions of end terminals via which users can download, subscribe to and use digital social media platform provided by processing center or back end of system 100.

Backend platform 104 may include components including, but not limited to, a processing platform/center 120. As will be described below with reference to FIG. 9, processing center 120 may have one or more memories storing computer-readable instructions, which may be performed by one or more associated processors to implement functionalities that will be described herein. Processing center 120 may also be referred to, throughout the present disclosure, as provider or platform operator 120.

Processing center 120 can provide a downloadable computer-executable application to any one or more of end terminals 106, 108 and 110.

Processing center 120 can have one or more associated databases such as databases 122. A number of databases 122 is not limited to three as shown in FIG. 1 and can be more or less depending on system requirement of system 100, resource consumptions and required resources to service end users and handle network traffic, etc. Databases 122 can be used for storing user profiles, user generated content, unique loyalty identifiers of users, etc., all of which will be described below in more detail.

Processing center 120 can communicate with databases 122 using any known or to be developed wired and/or wireless scheme. Furthermore, processing center 120 and/or databases 122 can be cloud based and hosted on one or more private, public and/or hybrid cloud structures that may be created and owned by owner and operator of processing center 120 and/or can be provided by a third party cloud service provider. While FIG. 1 illustrates a single processing center 120, the present disclosure is not limited thereto and processing center 120 may be implemented in a distributed manner using a network of connected servers to meet processing demands for processing interactions and communication with end terminals and/or other backend components.

Processing center 120 can further be communicatively coupled to one or more external databases and processing centers such as processing center 124 and/or database 126. processing center 124 and/or database 126 may belong to independent and third party content providers such as retailers, producers and sellers of commercial products in various industries such as clothing industry, fashion industry, cosmetics industry, home products, car manufacturers, food industry, entertainment services and content producers, travel services, etc.

Number of databases and processing centers for independent and third party content providers is not limited to processing center 124 and/or database 126 shown in FIG. 1 but may be more or less. In one example, processing center 120 may enter into agreements with operators of processing center 124 and/or database 126 such that various metadata collected and tracked by processing center 120 and used for generating unique loyalty identifiers for users can be exchanged with the third party content providers for possible coupons, promotions, etc., redeemable at such third party content providers by corresponding users, as will be described below.

Processing center 120 can be communicatively coupled to processing center 124 and/or database 126 via any known or to be developed wired and/or wireless scheme. Processing center 124 and/or database 126 may be cloud based.

As noted above, processing center 120 can provide a downloadable set of instructions (a downloadable application) to each end terminal 106, 108 and/or 108. Once downloaded, corresponding one of users 110, 112 and/or 114 can post media (e.g., video, audio, photographs) and provide various metadata associated with the posted media. The user generated content (posted media and associated metadata) may then be processed by the digital social media platform for hashtag embedding and be accessible to followers and other users having profiles on the digital social media platform. Processing center 120 may then track the followers and other's users online activities stemming from (based on) user generated content and determine/calculate loyalty identifiers for the corresponding one of users 110, 112 and/or 114, which may then be redeemable in the form of discounts, promotions, etc. at various merchants, retailers, etc. These set of functionalities will be described in more detail below.

Various example screens of the downloaded application for the digital social media platform will be described with reference to FIGS. 2-7. For ease of discussion, FIGS. 2-7 will be described with reference to end terminal 106 and corresponding user 112 and account of user 112 with the digital social media platform accessed via end terminal 106, however FIGS. 2-7 are applicable to any other user and end terminal via which the digital social media platform is accessed.

Figure 2:
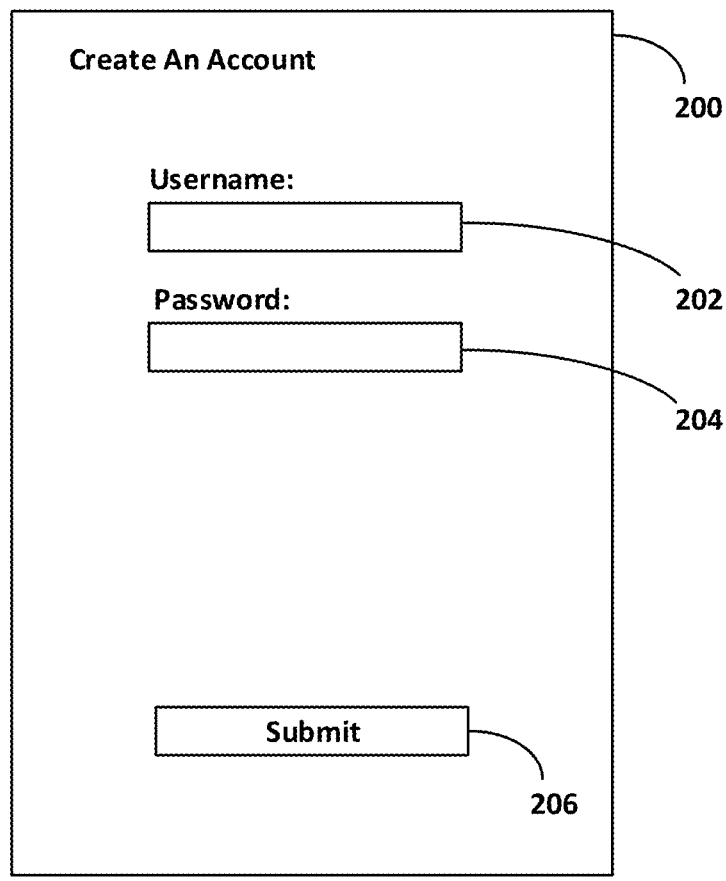
FIG. 2 illustrates an example screen of a digital social media platform, according to one aspect of the present disclosure.

FIG. 2 illustrates an example screen of a digital social media platform, according to one aspect of the present disclosure. Screen 200 may appear on end terminal 106 once the application is downloaded by user 112 on end terminal 106. Screen 200 may prompt user 112 to create an account by providing a username in command field 202 and a password in command field 204. Thereafter, user 112 may hit submit button 206 (e.g., a virtual submit button 206). In response, processing center 120 may process the entered information to determine if the entered username and password are valid. If not, user 112 may be prompted to re-enter a new username and/or password.

Once authorized and approved, user 112 may login to the application or (may be automatically logged into the application), every time user 112 starts the application on end terminal 106. Optionally, user 112 may opt in to automatically log into the digital social media platform application on end terminal 106 every time the application is selected and run on end terminal 106.

Figure 3:
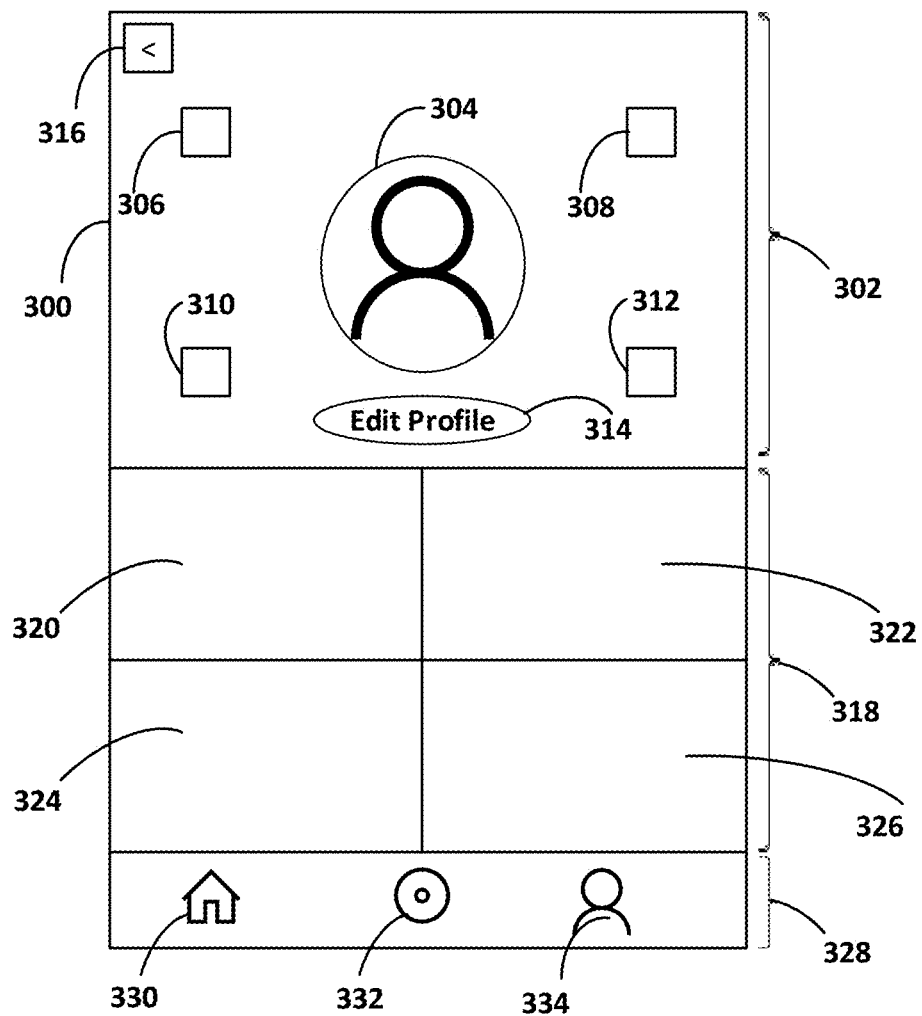
FIG. 3 is an example screen of a user's profile page on a digital social media platform, according to one aspect of the present disclosure.

FIG. 3 is an example screen of a user's profile page on a digital social media platform, according to one aspect of the present disclosure Screen 300 may be a profile page of user 112 associated with end terminal 106. Upon logging into the digital social media platform, each user may be taken to his or her profile page similar to screen 300.

Screen 300 may have several sections. Section 302 may provide an overview of user 112's statistics and optionally his or her profile picture (profile identifier) 304. As shown in section 302, in addition to profile picture 304, four exemplary statistics (user specific indicators) in association with user 112 appears. Such user specific indicators may be indicative of user 112's activities, postings and engagement of other users with media content posted/shared by user 112 on the digital social media platform, as will be described below.

Example statistics include loyalty statistics 306. Exemplary methodologies according to which user 112 accrues loyalty points based on embedded hashtags created for content uploaded by user 112 to the digital social media platform, will be described below. As an overview, a user may accrue certain number of points every time another user views, clicks, shops using embedded hashtags in media content uploaded by user 112.

Another example statistic may be referred to as tags statistic 308, which may be referred to as DNA tag 308. Tags statistic 308 may indicate a total number of tags and metadata specified for media content uploaded to profile of user 112 on the digital social media platform. For example, an element of an example media content uploaded to profile of user 112, may be a clothing item. Metadata associated with the clothing item may include associated category, brand and optionally a retailer. By entering information for each of the example metadata (e.g., 3 in this example), an existing tags statistic 308 for user 112 may be increased by one for each piece of information (e.g., 3 in this example and the change may be reflected as an updated tags statistic 308.

Another example statistic may be referred to as view statistic 310, which may also be referred to as Foto Shop 312, reflecting how many shops, views, clicks have resulted from an embedded hashtag(s) of a particular media content uploaded to profile of user 112. For example, each time an embedded hashtag into a particular item is accessed, viewed, clicked on and/or ultimately resulted in another user purchasing the same item, another similar item in the same category, another item from the same brand, and/or another item from the same retailer, view statistic 310 for user 112 may change (increase) and the change may be reflected as an updated view statistic 310.

Another example statistic may be network statistic 312, which may also be referred to as tribe statistic 312. Network statistic 312 may simply reflect a total number of connections (e.g., friends, contacts) with profiles followed by user 112 and/or are following profile of user 112 on the digital social media platform.

Section 302 may further include an edit profile option 314 which may be a virtual button that a user may click to access and edit profile of user 112 on the digital social media platform.

FIG. 3 also illustrates a virtual button 316 at top left corner of screen 300, which may be a shortcut that persists through various screens of the social media platform of the present disclosure. Virtual button 316 may allow access (quick shortcuts) to user 112's profile, favorite brands, option to search for particular user profiles, access to user specific loyalty identifier (social capital score), and option to sign out/terminate profile, all of which will be described below with reference to FIG. 4. As noted, virtual button 316 may persist through many (and/or every) different screen or page of digital social media platform, when user 112 logs into and browses the digital social media platform.

Screen 300 further includes section 318, which may be formed of (and continuously updated with) media content uploaded to user profile of user 112. As shown, section 318 includes an example of four tiles 320, 322, 324 and 326. Each of tiles 320, 322, 324 and 326 may correspond to a different media content uploaded to user profile of user 112. As more and more media content is uploaded to user profile of user 112, section 318 may become scrollable so that all uploaded content may be scrolled through, viewed and accessed, as desired.

Screen 300 also includes section 328. Section 328 may include 3 example virtual buttons. First example virtual button may be a home button 330, which may link to a home page (e.g., brand community) associated with media content uploaded to user profile of user 112. This will be further described below with reference to FIG. 6.

Section 328 may further include a media capturing button 332. Media capturing button 332 can active media capturing tools of end terminal 106 (e.g., a camera, a microphone, etc.) for user 112 to capture and record media content for uploading to his or her profile on the digital social media platform. Media capturing button 332 can alternatively allow user 112 to select already captured media content stored on end terminal 106 for uploading to the digital social media platform. Profile button 334 may take user 112 to another screen for editing his or her social media profile as will be described below with reference to FIG. 4.

While not shown, captured media content or an already existing media content selected for upload may be edited prior to uploading using various filters, zooming functions made available to users by provider of the digital social media platform of the present disclosure.

Section 328 may further include a user profile button 334, which when selected may take a viewer or user 112 back to user profile of user 112 shown in example screen 300.

In one example, section 328 may persist through every possible and different screen or view of the digital social media platform similar to virtual button 316. While section 328 is shown as having only three virtual buttons for accessing different components or sections/pages associated with digital social media platform of the present disclosure, the number of virtual buttons is not limited to three and may be more or less. In one example, virtual button 316 may also be included in section 328.

Figure 4:
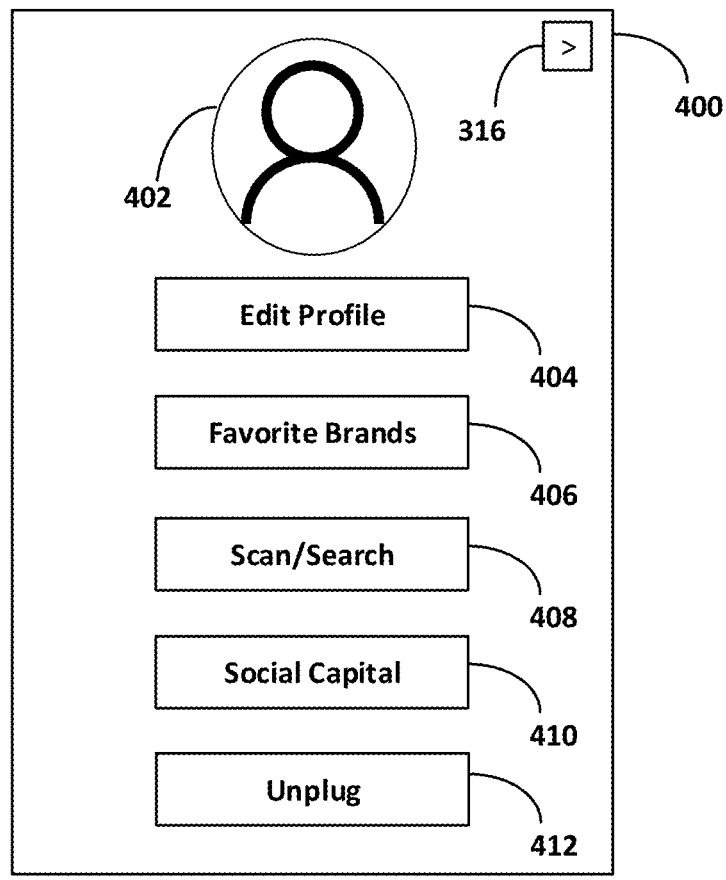
FIG. 4 is an example screen of a user's profile page on a digital social media platform, according to one aspect of the present disclosure.

FIG. 4 is an example screen of a user's profile page on a digital social media platform, according to one aspect of the present disclosure. Screen 400 illustrates an example page that may appear on end terminal 106 when virtual button 316 is activated. As described above, virtual button 316 may allow access (quick shortcuts) to user 112's profile, favorite brands, option to search for particular user profiles, access to user specific loyalty identifier (social capital score), and option to sign out/terminate profile.

As shown in FIG. 4, screen 400 may include profile picture 402, which may be the same as profile picture 304 of FIG. 3. Virtual button 316 may also be accessible via screen 400 for allowing user 112 to access a previously visited page or screen of the digital social media platform, from which screen 400 was accessed via virtual button 316.

Screen 400 further includes option (button) 404, via which user 112 may access and/or edit various pieces of personal information such as name, address, age, etc. that may be viewable by other users on the digital social media platform. Screen 400 further includes option (button) 406 that may allow user 112 to edit his or favorite brands, products, retailers, merchants, etc. (identified favorite brands, products, retailers, merchants, etc. can influence media content displayed on a home page of user 112 on end terminal 106, as will be described below).

Screen 400 further includes option (button) 408 that may allow user 112 to scan the digital social media platform for other postings and users based on various filtering criteria that may be specified by user 112. Screen 400 further includes option (button) 410 that may allow user 112 to view his or her user specific identity (user specific social capital), which may be embodied as a barcode, a two dimensional computer readable code (QR code), etc., that can be scanned for redeeming in terms of coupons, promotions, discounts, etc., at relevant merchants, as will be described more fully below. Screen 400 further includes option (button) 412 that may allow logging out of user profile of user 112, deactivating (unplugging) user profile of user 112 on the digital social media platform, etc.

As noted above, user 112 may wish, from time to time, to upload various media content onto his or her profile on the digital social media platform of the present application. Such media content maybe a photograph, a video, an audio, an animation, etc. Such media content may be captured using end terminal 106 after selecting media capturing button 332, which may take user 112 to screen 500 of FIG. 5.

Figure 5:
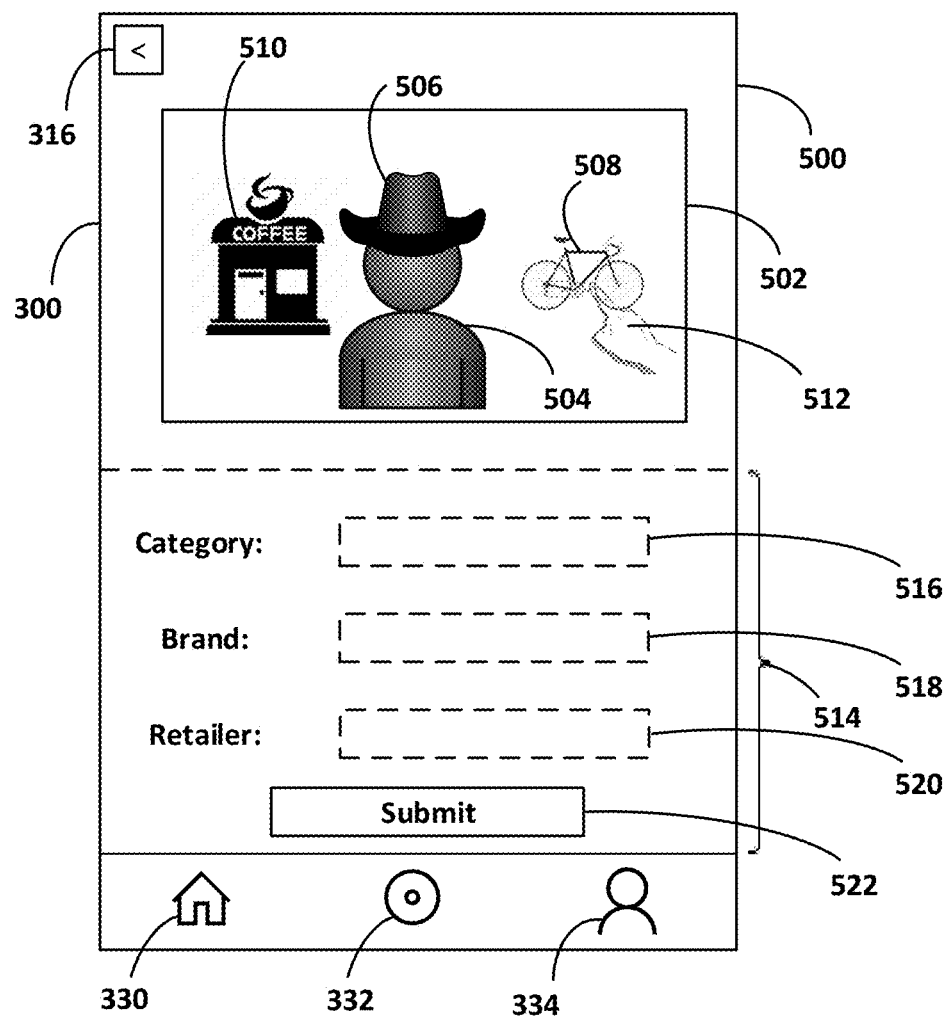
FIG. 5 is an example screen of a user's profile page on a digital social media platform, according to one aspect of the present disclosure.

FIG. 5 is an example screen of a user's profile page on a digital social media platform, according to one aspect of the present disclosure. Screen 500 includes persisting virtual buttons 316, 330, 332 and 334, as described above.

Screen 500 shows an example media content 502, which may either be taken live by user 112 using media capturing capabilities of end terminal 106 or may be uploaded from existing media content available on end terminal 106. Example media content 502 may be a photograph of a human being 504 (headshot) wearing hat 506. Media content 502 may also include one or more elements in the background of human being 504 such as bicycle 508 and coffee shop 510. Media content 502 is not limited to the example shown in FIG. 5 but can be any other type of content and may include more or less elements.

Once media content 502 is captured/selected, user 112 using for example his or her finger 512, may touch and hold any element in media content 502 for initiating the tagging process of that selected element. For example, using finger 512, user 112 may select bicycle 508 for tagging. Once touched and held, section 514 may appear on screen 500. Section 500 may include a plurality of categories for entering metadata for the selected element (e.g., bicycle 508) to which a response may be entered. For example, for bicycle 508 shown in example media content 502, a category (e.g., outdoor gears) may be entered in field 516, a brand (e.g., Fiji) may be entered in command field 518 and optionally, a retailer (e.g., Performance Bike) may be entered in command field 520. Responses to these commands may be collectively referred to as metatags (a set of metatags or a set of metadata) for element (bicycle) 508 in media content 502. Thereafter, media content 502 and corresponding metatags may be submitted to processing center 120 via submit button 522. As will be described below, metadata provided via fields 516, 518 and 520 may be used by processing center 120 to create and embed hashtags into media content 502 for posting to relevant communities within the digital social media platform of the present disclosure and monitoring of the hashtags and interactions of other users with such hashtags for creating personalized and user specific loyalty identifier for user 112. The above process for tagging and providing associated metatags may be repeated for any number of desired elements within media content 502.

Figure 6:
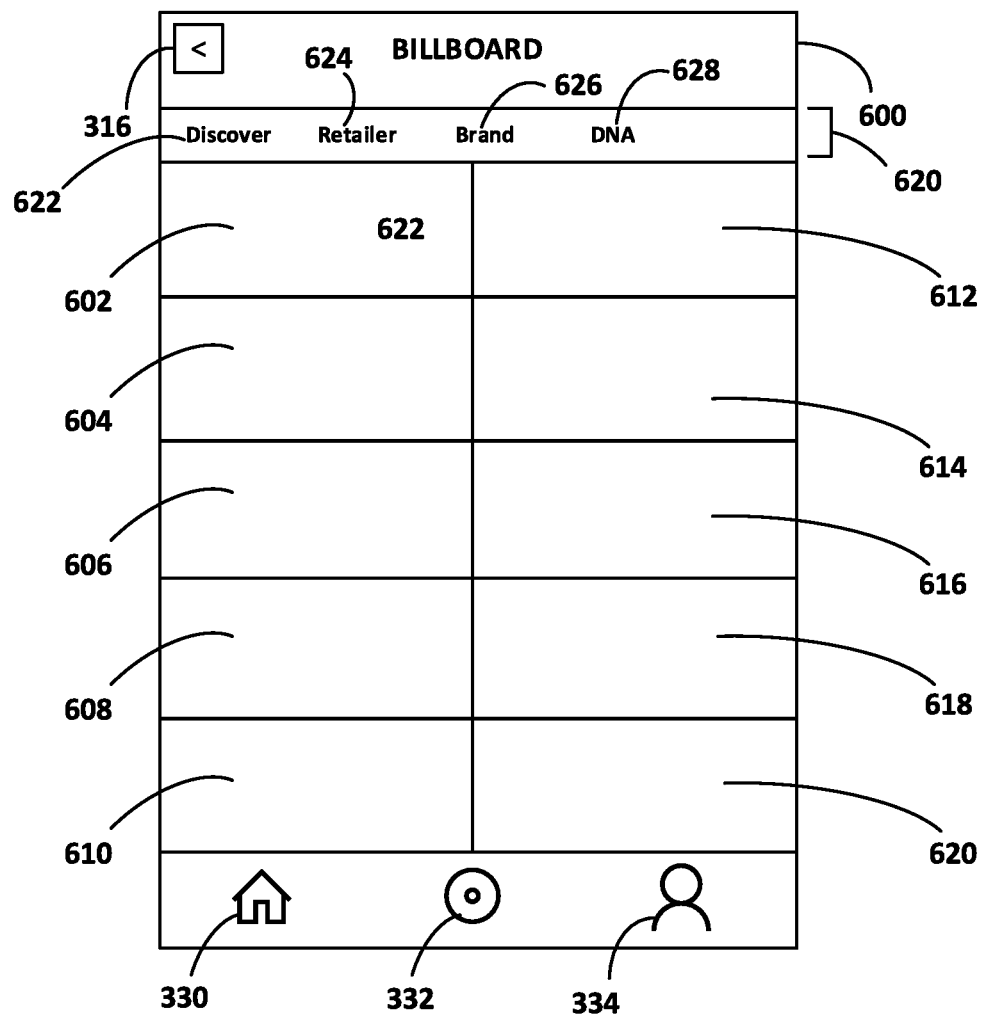
FIG. 6 is an example screen of a user's profile page on a digital social media platform, according to one aspect of the present disclosure.

FIG. 6 is an example screen of a user's profile page on a digital social media platform, according to one aspect of the present disclosure. Once media content 502 and associated metatags of selected element(s) thereof are submitted for creation and embedding of hashtags, screen 500 may be switched to screen 600 of FIG. 6, which may be referred to as billboard or home page (also accessible via home button 330).

Screen 600 may be a tailored billboard or homepage for user 112 displayed on end terminal 106. Screen 600 may include persisting virtual buttons 316, 330, 332 and 334, as described above. Billboard of screen 600 may include a plurality of tiles 602, 604, 606, 608, 610, 612, 614, 616 and 618. Each of tiles 602, 604, 606, 608, 610, 612, 614 and 616 may be an uploaded content with embedded hashtags by other users of the digital social media platform. Every other user may generate content and provide associated metatags in a same manner as described above with reference to FIG. 5.

As will be described below, processing center 120 may filter uploaded contents of other users with embedded hashtags to determine which ones to include in billboard 600 for user 112 to view. This filtering may be based on favorite brands identified by user 112 using favorite brands option 406 described with reference to FIG. 4, any one of brands, categories or retailers specified as metadata of any one or more elements of media content 502, etc. Such filtering may also be coupled with geolocation of end terminal 106 and may be filtered to include uploaded media content of other users that are within a specific geolocation of end terminal 106 and have one or more embedded hashtags within their uploaded content with the same brand, retailer, product category as that of one or more elements of uploaded media content on user profile of user 112 on the digital social media platform. For example, referring back to FIG. 5, bicycle 508 may have an embedded hashtag that includes product category, brand and retailer information for bicycle 508. Assuming media content 502 is the only media content uploaded by user 112 on his or her profile, then each one of tiles 602, 604, 608, 610, 612, 614 and/or 616 may include an uploaded content by other users of the digital social media platform with embedded hashtags that reflect the same or similar product category and/or the same or similar brand and/or the same or similar retailer information as the metadata of bicycle 508.

In other words, tiles 602, 604, 608, 610, 612, 614 and 616 may provide a brand community, a retailer community, a product category community that is tailored to user 112 and is relevant to media content and associated embedded hashtags available on user profile of user 112 on the digital social media platform.

Screen 600 further includes a section 620 with multiple options/filters to be selected for discovering relevant communities for user 112. For example, section 620 may have label 622 (Discover). Furthermore, section 620 may have selectable options such as option 624 for retailer, option 626 for brand, and option 628 for collective tags (DNA), etc. Selection of any one of these, results in tiles 602, 604, 608, 610, 612, 614 and 616 to be filtered to show communities corresponding only to the selected option. For example, if option 624 is selected and assuming that the only uploaded media content by user 112 is media content 502 as discussed, then processing center 120 filters all media content provided by other users to select only media contents with embedded hashtags reflecting Performance Bike (e.g., retailer associated with bicycle 508 described in the non-limiting example of FIG. 5), to be included in tiles 602, 604, 608, 610, 612, 614 and 616. Number of tiles is not limited to tiles 602, 604, 608, 610, 612, 614 and 616 but may be more or less. If more, screen 600 allows a user thereof to scroll up and down to view various available tiles and relevant media content provided by other users and included in a displayed community on screen 600.

Figure 7:
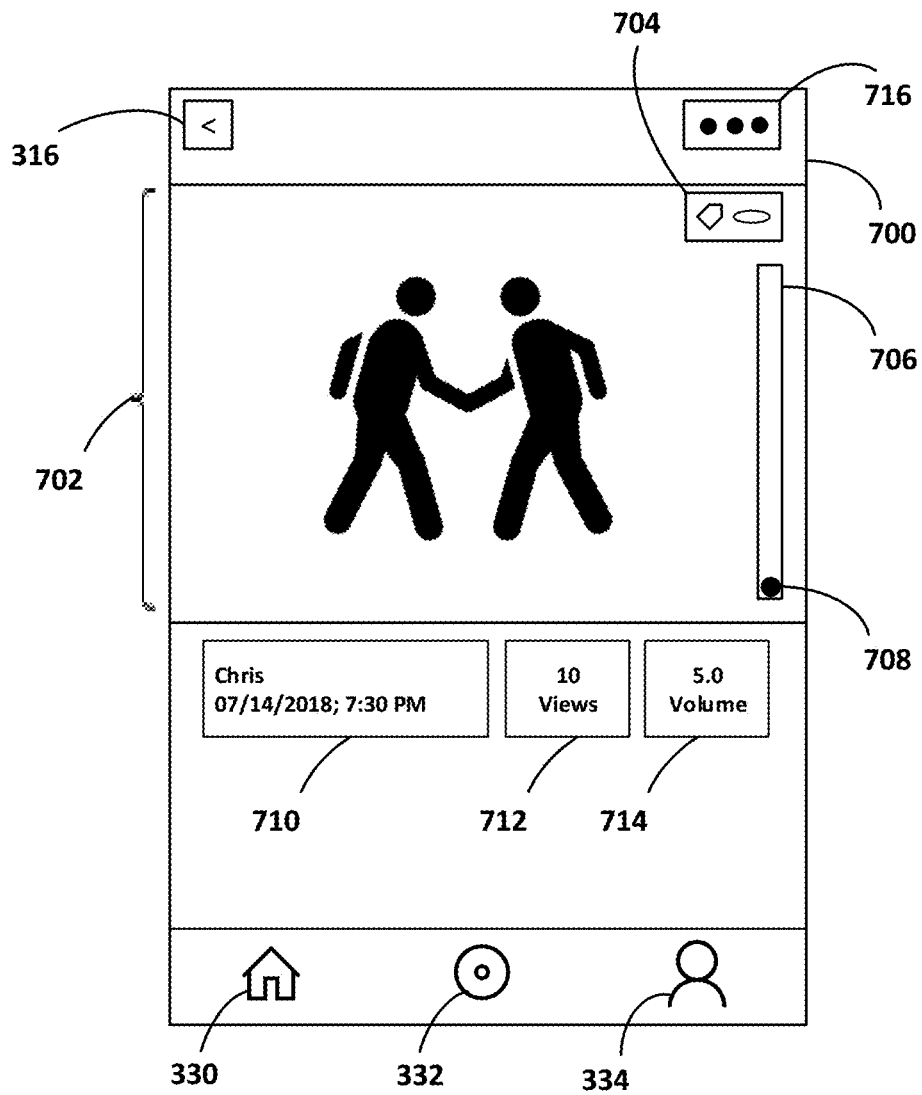
FIG. 7 is an example screen of a user's profile page on a digital social media platform, according to one aspect of the present disclosure.

FIG. 7 is an example screen of a user's profile page on a digital social media platform, according to one aspect of the present disclosure. More specifically, screen 700 of FIG. 7 illustrates a page on end terminal 106 when any one of tiles 602, 604, 606, 608, 610, 612, 614 or 616 is selected, each of which may be media content with embedded hashtags created by any other user within the brand community that is included in section 620 of screen 600.

As shown in FIG. 7, screen 700 may include persisting virtual buttons 316, 330, 332 and 334, as described above. Alternatively, virtual button 316 may be used for returning to screen 600. Screen 700 may include a content display area 702, which may display an uploaded media content (e.g., two individuals shaking hands, as shown in FIG. 7) selected from among tiles 602, 604, 606, 608, 610, 612, 614 or 616. This content may have one or more embedded hashtags. For purposes of describing FIG. 7, an assumption is made that media content shown in content display area 702 has been uploaded by user 114 via end terminal 108.

Hashtag virtual button 704, once selected, displays within media content shown in content display area 702, any element thereof that has an embedded hashtag created based on metadata provided by user 114. For example, selecting button 704 may display a virtual tag on upper body (e.g., a sweater) of one of the depicted individuals in the media content in display area 702 and another tag on a pair of pants of another one of the depicted individuals in the media content in display area 702 (assuming that the sweater and the pair of pants were selected for tagging by user 114 and corresponding metadata provided via end terminal 108.

Any one of the virtual tags corresponding to the example sweater or pair of pants may be selected, which results in a larger virtual tag to appear within display area 702. This larger tag may convey category of the tagged item (e.g., men's clothing, etc.), a brand of the sweater or the pair of pants and a link for "Go Shopping," which may be selected by user 112 on end terminal 106 that can then redirect (by switching to a web browser) user 112 to a website of the brand associated with the sweater/pair of pants or a retailer associated with the sweater/pair of pants.

In one example embodiment, user 112 may be directed to the website associated with the corresponding brand/retailer of a tagged item such as the example sweater/ pair of pants or may be taken to specific sections within the website that only includes same/similar sweaters or pairs of pants. As will be described below, any of the above actions taken on end terminal 106 (i.e., selecting to view media content uploaded by user 114 via end terminal 108, viewing tags, visiting corresponding brand/retailer websites and/or purchasing items with the visited websites) may result in loyalty points to be accrued by user 114 and used to calculate a user specific loyalty identifier (social capital score) for user 114. Same may be done for user 112 if other users view and engage/interact with media content 502 uploaded by user 112 onto his or her profile on the digital social media platform.

Screen 700 may further include a bar 706 with a virtual knob/button 708. As media content within display area 702 is viewed, virtual knob/button 708 may be moved up or down along bar 706 to indicate a varying level of interest in the media content and the embedded hashtags thereof being viewed by user 112 on end terminal 106. For example, a high level of interest may be indicated by moving virtual knob/button 708 to the upper most part of bar 706 while a lowest level of interest may be indicated by leaving virtual knob/button 708 as currently shown in FIG. 7.

Screen 700 may further include various pieces of information associated with media content being displayed within display area 702. For example, identification information 710 may include a name of a user of the digital social media platform who uploaded the displayed media content (e.g., user 114 in this example). Furthermore, information 712 may indicate a number of user views of the displayed media content and information 714 may indicate a volume of the displayed media content (which can vary based on level of interest indicated via bar 706 and knob 708.

Screen 700 may optionally include access button 716 which may allow an operator or viewer of end terminal 106 such as user 112 to report to backend platform 104 of system 100 and operators of the digital social media platform suspicious or inappropriate media content that may be in violation of civil laws or regulations, may be criminal and/or may be in violation of agreed upon policies or rules of conduct on the digital social media platform.

With various screens and example of the digital social media platform of the present application, as accessible for viewing and engagement with, on a given end terminal by a corresponding operator thereof (e.g., such as end terminal 106 and user 112 referenced throughout description of FIGS. 2-7), the disclosure now describes example methods implemented by backend platform 104 and in particular processing center 120 to creating and embedding hashtags for each uploaded media content based on corresponding metadata provided as well as tracking other users' interactions and engagements with tagged media content for purposes of determining user specific loyalty points and user specific loyalty identifiers (social capital scores).

Figure 8:
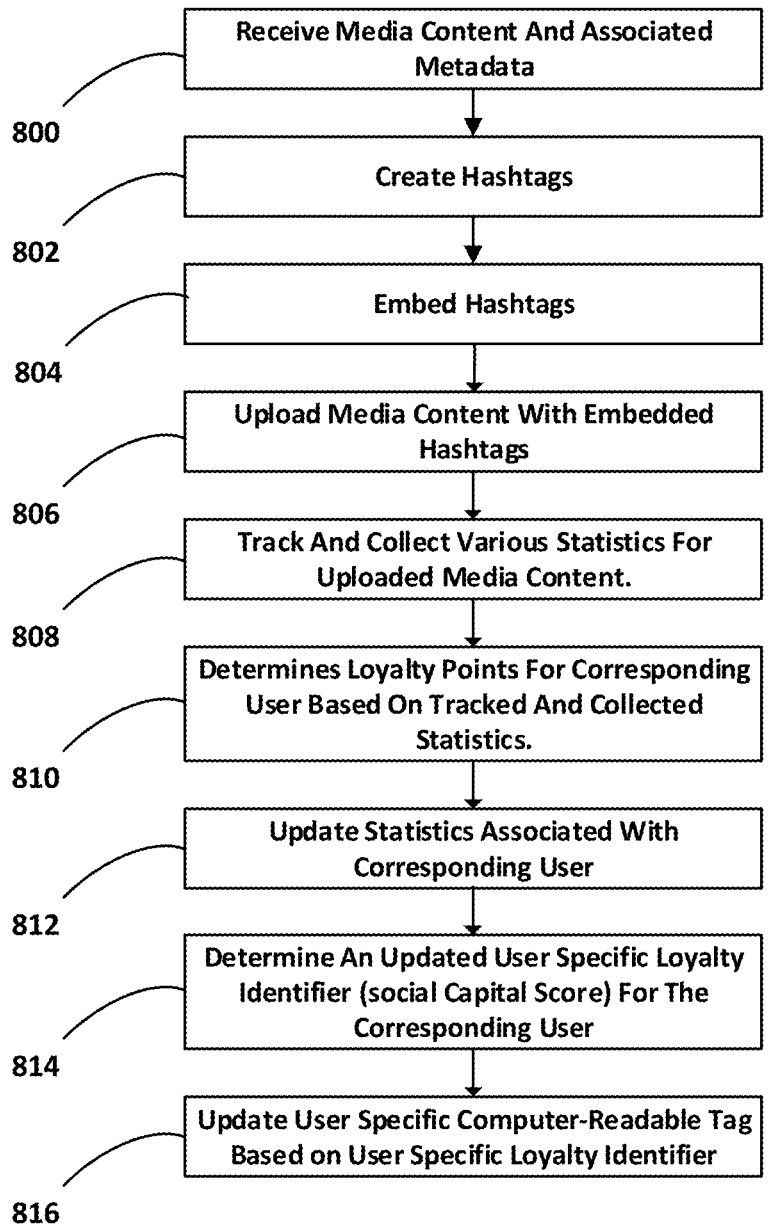
FIG. 8 describes an example method of creating, embedding and tracking hashtags for creating user specific loyalty identifiers, according to one aspect of the present disclosure.

FIG. 8 describes an example method of creating, embedding and tracking hashtags for creating user specific loyalty identifiers, according to one aspect of the present disclosure. FIG. 8 will be described from the perspective of processing center 120. As mentioned above, processing center 120 may have one or more processors configured to execute computer readable instructions stored in one or more associated memories for implementing steps of FIG. 8. FIGS. 1-7 may be referred to when describing steps of FIG. 8.

At S800, processing center 120 receives media content and associated metadata data. For example, processing center 120 receives media content 502 via end terminal 106 with one or more sets of metadata, where each set of metadata may corresponding to one specific element (e.g., bicycle 508) within media content 502.

At S802, processing center 120, using any known or to be developed method, may create/generate hashtags. Each hashtag may be created/generated for each element of the received media content for which a set of metadata is also provided. For example, processing center creates hashtag for bicycle 508 using metadata (e.g., product category, brand and/or retailer as described above) provided by user 112, via end terminal 106. The created hashtag may be similar to any one of hashtags that may later on be viewed and accessed by another user in a similar fashion as described above with reference to FIG. 7, when hashtags for the example sweater and pair of pants within media content uploaded by user 114 was described.

At S804, processing center embeds the created hashtags within the corresponding media content received at S800. In one example, a separate hashtag may be embedded for every element within media content 502 and in association with a corresponding element within the media content for which the corresponding set of metadata is received. For example, if hat 506 is an element within media content 502, then a hashtag is created for hat 506 and is embedded in relation to hat 506 such that whenever a viewer selects virtual button 704, a virtual hashtag appears on or near hat 506 within media content 502.

At S806, processing center 120 uploads (sends or publishes) media content 502 with embedded hashtags to communities (virtual communities) on profiles of other users of the digital social media platform based on a match between product categories, tags, brands, retailers associated with media content 502 and those associated with media content uploaded by other users of the digital media social platform. In one example, the matching may also take into consideration geographical proximities and geo locations when determining which communities to include media content 502 in.

At S808, processing center 120 tracks and collects various statistics for media content 502. The statistics may reflect engagement and interaction of other users with media 502 and associated embedded hashtags. In one examples, the statistics include, but are not limited to, number of views of media content 502 by other users, number of views of embedded hashtags of media content 502, number of visits to associated brands/retailers of each embedded hashtag of media content 502, whether another user has made an attempt or completed a purchase of a similar or different product from the same retailer/brand or alternatively a similar product from other retailers/brands, etc.

At S810, processing center 120 determines loyalty points for user 112 based on the statistics tracked and collected at S808 for media content 502. In one example, loyalty points may be determined partially based on the collected statistics. For example, processing center 120 may assign a number of points for uploading content, providing metadata for element(s) within an uploaded content, etc. In one specific example, 5 loyalty points for uploading media content 502, 1 loyalty point for tagging each element such as bicycle 508, 1 loyalty point for providing brand metadata, 1 loyalty point for providing category metadata, 1 loyalty point for providing retailer metadata, may be assigned.

Furthermore, each collected statistic may result in a certain number of loyalty points being accrued by a corresponding user (e.g., user 112). For example, each view of media content 502 by another user may result in 1 loyalty point, each rating (e.g., using knob 708 and bar 706 of FIG. 7) may result in a loyalty point ranging from 1-5 depending on the varying rating indicated using bar 706 and knob 708, each click on an embedded hashtag and redirecting to a corresponding brand/retailer website may result in 10 loyalty points, each purchase made during such visit may result in 20 loyalty points. In one example embodiment, the specific type of item purchased may result in different number of loyalty points. For example, exact item may result in 20 loyalty points for user 112, similar item may result in 18 loyalty points, etc.

The above example numbers of loyalty points for each piece of information are non-limiting and may be adjusted by operators of processing center 120 (programmed or modified) based on experiments and/or empirical studies.

At S812, processing center 120 updates statistic associated with corresponding user and may reflect the same on profile of the corresponding user on the user's end terminal. For example, as a result of tracking engagements and interactions with content 502 and the resulting statistics, various statistics such as loyalty statistic 306, tags statistic 308, view statistic 310 and/or network statistic 312, described above with reference to FIG. 3, may be modified or updated (e.g., loyalty statistic 306 and view statistic 310 may be increased).

At S814, processing center 120 may determine an updated user specific loyalty identifier (social capital score) for the corresponding user (e.g., user 112) based on a weighted combination of updated loyalty statistics 306, tags statistic 308, view statistic 310 and/or network statistic 312. The weights and exact combination of these statistics for determining user specific loyalty identifier for a given user may be configurable and determined based on experiments and/or empirical studies.

At S816, processing center 120 may update a computer-readable tag (e.g., a barcode or a QR code) that is reflective of a corresponding user's social capital score and visited/associated brands, retailers, products, etc. This computer-readable tag may be accessible via option 410 as described above with respect to FIG. 8. Computer-readable tag may be reflective of user 112's specific loyalty identifier may contain information about various purchases, brands, retailers, product types and categories of interest to user 112 and is also reflective/indicator of user 112's circle or level of influence on other users within the virtual communities of the digital social media platform of the present application having similar interests as user 112. In other words, user specific identifier (social capital score) of user 112 is an indicator of his or her level of influence, within various relevant communities on the digital social media platform, related to causing or triggering other/similar purchases by other users after viewing media content posted by user 112.

As noted above with respect to FIG. 1, processing center 120 and more generally the digital social media platform of the present application may partner with a number of retailers, brands, merchants, etc. such as those associated with processing center 124 and/or database 126. Given that computer-readable tag of S816 includes and embeds information about multiple purchases and interests and loyalty of user 112, computer-readable code may be scanned by any reading/image capturing device (e.g., a point of sale device) of any one of the partner retailers, brands, merchants, etc., to provide user 112 with relevant discounts, promotions, coupons, etc., when user 112 and end terminal 106 are detected within a premise operated by any one of partner retailers, brands, merchants, etc. In another example, scanning of the computer-readable tag may redirect user 112 from his or her profile page to a web site associated with a merchant/retailer/brand, when the scanning is performed by a device associated with that same merchant/retailer/brand.

In one example, an exact methodology used for converting user 112's social capital score into coupons, promotions, discounts, etc., may be implemented by retailer/brand specific algorithms that may determine, for example, how many loyalty points or what score ranges should be translated into certain discounts, a certain coupon, a certain extra free item or items, etc.

In another aspect, digital social media platform of the present application, when downloaded on an end terminal, may prompt user 112 whether a specific browser should be associated with digital social media platform of the present application such that whenever a link (e.g., "Go shopping" link described above) is selected or whenever computer-readable tag is selected, the specific browser will be used as a default browser for accessing the relevant merchant/retailer/brand website. Such specific browser may be a secure browser that prevents tracking cookies related to user 112's browsing on the specific browser and/or prevents any advertisements from being displayed on end terminal 106. In another example, such browser may be crypto based, where user 112 can earn cryptocurrencies for the time he or she spends browsing on the specific browser. In one example, such cryptocurrencies accrued by user 112 may be coupled to user 112's social capital score for redemption as coupons, discounts, promotions, etc. at relevant merchants, retailers, brands, etc.

With above examples of the digital social media of the present application, the disclosure now turns to description of components of possible devices that may be implemented as any one or more of end terminals 106, 108, 110, processing center 120 and/or any other component of system 100 described above with reference to FIG. 1.

Figure 9:
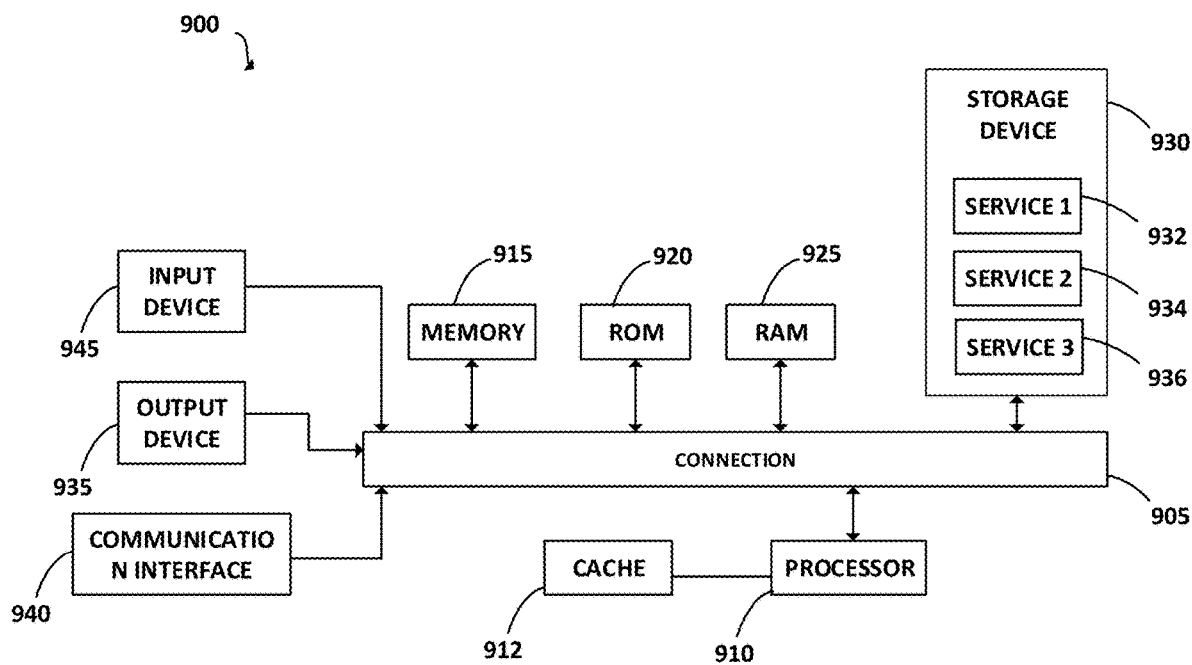
FIG. 9 shows an example of a system for implementing the present technology in accordance one aspect of the present disclosure.

FIG. 9 shows an example of a system for implementing the present technology in accordance one aspect of the present disclosure. FIG. 9 shows an example of computing system 900 in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) and random access memory (RAM) to processor 910 . Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 605, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving, by a processing center communicatively coupled to at least one server, from at least one terminal of a publishing user and via computer-readable instructions executing on said terminal which were received by the terminal from the at least one server, (1) media content to be posted to a digital social media platform, (2) one or more tags, each of the one or more tags corresponding to a distinct visual element depicted within the media content, and (3) one set of metadata for each of the one or more tags, each set of metadata identifying information which the publishing user has, via use of the computer-readable instructions executing on the at least one terminal, associated with a corresponding distinct visual element depicted within the media content;
    generating, by the processing center, for each distinct visual element for which a tag has been received and based on a corresponding set of metadata received in association with the tag, a unique interactive hashtag;
    embedding, by the processing center, each generated unique interactive hashtag within the media content such that each unique interactive hashtag is displayable at a corresponding location of a corresponding distinct visual element within the media content, each unique interactive hashtag being visible to and accessible by a viewing user and each unique interactive hashtag including an embedded link, which when selected, allows the viewing user to gain access to external online sources offering the corresponding distinct visual element for sale; publishing, by the processing center, the media content with each embedded hashtag, to the digital social media platform for viewing by one or more viewing users of the digital social media platform via corresponding end terminals, each embedded hashtag being viewable and accessible by the one or more viewing users after selection of a virtual hashtag button displayed on the corresponding end terminals of the one or more viewing users along with the published media content;

executing an event-based real-time algorithm to create a value for the publishing user, execution of the event-based real-time algorithm including:

monitoring, by the processing center, interactions of the one or more viewing users with the published media content to detect one of a plurality of events, each event being indicative of a different type of interaction of one of the one or more viewing users with the published media content and having a unique number of points associated therewith;

upon detection of one or more of the plurality of events, updating a user specific indicator for the publishing user by adding the unique number of points of each detected event to the user specific indicator, the user specific indicator including a cumulative number of points of each detected one of the plurality of events, the cumulative number of points being a social capital score and an indicator of a value of the publishing user; and updating, by the processing center, a dashboard on a first user interface of an application executing, as part of the executable computer-readable instructions, on a corresponding terminal of the publishing user to display the user specific indicator and display one or more statistics corresponding to a total number of sets of metadata provided by the publishing user, a number of views of each published media content provided by the publishing user and a number of connections of the publishing user on the digital social media platform;

generating, by the processing center, a computer-readable code that includes the updated user specific indicator, the computer-readable code being readable at a point of sale of any one of multiple merchants, brands and retailers partnered with the social media platform; and presenting, by the processing center and via a second user interface of the application executing on the corresponding terminal of the publishing user, the computer-readable code on the corresponding terminal of the publishing user to be scanned for redeeming one or more promotions at any one of the multiple merchants, brands and retailers.

2. The method of claim 1, wherein execution of the event-based real-time algorithm is triggered when the one or more viewing users select at least one distinct visual element with corresponding embedded hashtag within the media content.

3. The method of claim 1, wherein the interactions with the media content having one or more embedded hashtags includes viewing the media content, visiting a website of a brand or a retailer associated with at least one distinct visual element in the media content, purchasing at least one product from the website, and purchasing a same or similar product as the distinct visual element in the media content.

4. The method of claim 1, wherein publishing the media content with each embedded hashtag includes sending the media content with each embedded hashtag to at least one community of users on the digital social media platform having at least one matching factor with the publishing user.

5. The method of claim 1, wherein the information associated with each distinct visual element within the media content includes a category and a brand associated with a corresponding distinct visual element.

6. The method of claim 1, further comprising:
detecting that the computer-readable code is scanned at a point of sale device; and
directing the publishing user, on the corresponding terminal of the publishing user, to a website associated with a merchant for one of browsing or shopping.

7. A digital social media platform comprising:
at least one server configured to provide at least one end terminal with downloadable and executable computer-readable instructions for providing a corresponding user access to services of the digital media platform;
a processing center communicatively coupled to the at least one server and to the at least one end terminal and configured to:
receive, from the at least one terminal of a publishing user, (1) media content to be posted to the digital social media platform, (2) one or more tags, each of the one or more tags corresponding to a distinct visual element depicted within the media content, and (3) one set of metadata for each of the one or more tags, each set of metadata identifying information which the publishing user has, via use of the computer-readable instructions executing on the at least one terminal, associated with a corresponding distinct visual element depicted within the media content;
generate for each distinct visual element for which a tag has been received and based on a corresponding set of metadata received in association with the tag, a unique interactive hashtag;
embed each generated unique interactive hashtag within the media content such that each unique interactive hashtag is displayable at a corresponding location of a corresponding distinct visual element within the media content, each unique interactive hashtag being visible to and accessible by a viewing user and each unique interactive hashtag including an embedded link, which when selected, allows the viewing user to gain access to external online sources offering the corresponding distinct visual element for sale;
publish the media content with each embedded hashtag to the digital social media platform for viewing by one or more viewing users of the digital social media platform via corresponding end terminals, each embedded hashtag being viewable and accessible by the one or more viewing users after selection of a virtual hashtag button displayed on the corresponding end terminals of the one or more viewing users along with the published media content;
execute an event-based real-time algorithm to create a value for the publishing user, execution of the event-based real-time algorithm including:
monitoring interactions of the one or more viewing users with the published media content to detect one of a plurality of events, each event being indicative of a different type of interaction of one of the one or more viewing users with the published media content and having a unique number of points associated therewith;

upon detection of one or more of the plurality of events, updating a user specific indicator for the publishing user by adding the unique number of points of each detected event to the user specific indicator, the user specific indicator including a cumulative number of points of each detected one of the plurality of events, the cumulative number of points being a social capital score and an indicator of a value of the publishing user; and updating a dashboard on a user interface of an application executing, as part of the executable computer-readable instructions, on the at least one terminal of the publishing user to display the user specific indicator and display one or more statistics corresponding to a total number of sets of metadata provided by the publishing user, a number of views of each published media content provided by the publishing user and a number of connections of the publishing user on the digital social media platform;

generate a computer-readable code that includes the updated user specific indicator, the computer-readable code being readable at a point of sale of any one of multiple merchants, brands and retailers partnered with the social media platform; and present the computer-readable code on the at least one end terminal of the publishing user to be scanned for redeeming one or more promotions at any one of the multiple merchants, brands and retailers.

8. The digital social media platform of claim 7, wherein the processing center is configured to initiate execution of the event-based real-time algorithm when one or more of the viewing users selects at least one distinct visual element with a corresponding embedded hashtag within the media content.

9. The digital social media platform of claim 7, wherein the interactions with the media content having one or more embedded hashtags includes viewing the media content, visiting a website of a brand or a retailer associated with at least one distinct visual element in the media content, purchasing at least one product from the website, and purchasing a same or similar product as the distinct visual element in the media content.

10. The digital social media platform of claim 7, wherein the processing center is configured to publish the media content with each embedded hashtag by sending the media content with each embedded hashtag to at least one community of users on the digital social media platform having at least one matching factor with the publishing user.

11. The digital social media platform of claim 7, wherein the information associated with each distinct visual element within the media content includes a category and a brand associated with a corresponding distinct visual element.

12. The digital social media platform of claim 7, wherein the processing center is further configured to:

detect that the computer-readable code is scanned at a point of sale device; and direct the publishing user, on the at least one terminal, to a website associated with a merchant for one of browsing or shopping.

13. One or more non-transitory computer-readable media comprising a first set of computer-readable instructions, which when executed by one or more processors of a server, cause the one or more processors to:

receive, from at least one terminal of a publishing user executing second computer-readable instructions executing on said terminal received from the server, (1) media content to be posted to a digital social media platform, (2) one or more tags, each of the one or more tags corresponding to a distinct visual element depicted within the media content and (3) one set of metadata for each of the one or more tags, each set of metadata identifying information, which the publishing user has, via use of the computer-readable instructions executing on the at least one terminal, associated with a corresponding distinct visual element depicted within the media content;

generate, for each distinct visual element for which a tag has been received and based on a corresponding set of metadata received in association with the tag, a unique interactive hashtag;

embed each generated unique interactive hashtag within the media content such that each unique interactive hashtag is displayable at a corresponding location of a corresponding distinct visual element within the media content, each unique interactive hashtag being visible to and accessible by a viewing user and each unique interactive hashtag including an embedded link, which when selected, allows the viewing user to gain access to external online sources offering the corresponding distinct visual element for sale;

publish the media content with each embedded hashtag to the digital social media platform for viewing by one or more viewing users of the digital social media platform via corresponding end terminals, each embedded hashtag being viewable and accessible by the one or more viewing users after selection of a virtual hashtag button displayed on the corresponding end terminals of the one or more viewing users along with the published media content;

execute an event-based real-time algorithm to create a value for the publishing user, execution of the event-based real-time algorithm including:

monitoring interactions of the one or more viewing users with the published media content to detect one of a plurality of events, each event being indicative of a different type of interaction of one of the one or more viewing users with the media content and having a unique number of points associated therewith;

upon detection of one or more of the plurality of events, updating a user specific indicator for the publishing user by adding the unique number of points of each detected event to the user specific indicator, the user specific indicator including a cumulative number of points of each detected one of the plurality of events, the cumulative number of points being a social capital score and an indicator of a value of the publishing user; and updating a dashboard on a user interface of an application executing, as part of the second set of executable computer-readable instructions, on the at least one terminal of the publishing user to display the user specific indicator and display one or more statistics corresponding to a total number of sets of metadata provided by the publishing user, a number of views of each media content provided by the publishing user and a number of connections of the publishing user on the digital social media platform;

generate a computer-readable code incorporating the updated user specific indicator, the computer-readable code being readable at a point of sale of any one of multiple merchants, brands and retailers partnered with the social media platform; and present the computer-readable code on the at least one terminal of the publishing user for redeeming one or more promotions at any one of the multiple merchants, brands and retailers.

14. The one or more non-transitory computer-readable media of claim 13, wherein the one or more promotions include one of a coupon, a promotion or a discount at a corresponding site of one of the multiple merchants, brands and retailers.

15. The one or more non-transitory computer-readable media of claim 13, wherein the first set of computer-readable instructions, when executed by the one or more processors of the server, further cause the server to execute the event-based real-time algorithm when the one or more viewing users select at least one distinct visual element with an embedded hashtag within the media content.

16. The one or more non-transitory computer-readable media of claim 15, wherein the interactions with the media content having at least one embedded hashtag include viewing the media content, visiting a website of a brand or a retailer associated with an at least one distinct visual element in the media content, purchasing at least one product from the website, and purchasing a same or similar product as the distinct visual element in the media content.

17. The one or more non-transitory computer-readable media of claim 13, wherein the first set of computer-readable instructions, when executed by the one or more processors of the server, further cause the server to publish the media content with each embedded hashtag by sending the media content with each embedded hashtag to at least one community of users on the digital social media platform having at least one matching factor with the publishing user.

18. The one or more non-transitory computer-readable media of claim 13, wherein the information associated with each distinct visual element within the content includes a category and a brand associated with a corresponding distinct visual element.

19. The one or more non-transitory computer-readable media of claim 13, wherein the first set of computer-readable instructions, when executed by the one or more processors of the server, further cause the server to:
  detect that the computer-readable code is scanned at a point of sale device; and
  direct the publishing user, on the at least one terminal, to a website associated with a merchant for one of browsing or shopping.

* * * * *